(12) United States Patent
Ahmed

(10) Patent No.: US 9,430,682 B1
(45) Date of Patent: Aug. 30, 2016

(54) PRESSURE PROFILE DATA CODING SYSTEM AND METHOD

(71) Applicant: KING SAUD UNIVERSITY, Riyadh (SA)

(72) Inventor: Mostafa Abdelhamid Mohamed Ahmed, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/867,735

(22) Filed: Sep. 28, 2015

(51) Int. Cl.
 G06F 17/00 (2006.01)
 G06K 7/04 (2006.01)
 G06K 19/063 (2006.01)

(52) U.S. Cl.
 CPC .............. *G06K 7/045* (2013.01); *G06K 19/063* (2013.01)

(58) Field of Classification Search
 CPC .............. G06K 7/12; G06K 19/06037; G06K 19/06028; G06K 19/06103; G06K 19/0614; G06K 2019/06225; G06K 19/0716; G06K 19/0717; G06K 19/0723; G06K 19/14; G06K 1/121; G06K 7/10346; G06K 7/10544; G06K 7/045; G06K 19/063
 USPC .................. 235/488, 492, 494, 454
 See application file for complete search history.

(56) References Cited

U.S. PATENT DOCUMENTS

| | | | |
|---|---|---|---|
| 3,987,277 A | 10/1976 | Kratt et al. | |
| 5,278,400 A * | 1/1994 | Appel | G06K 7/14 235/454 |
| 5,995,118 A | 11/1999 | Masuda | |
| 6,863,218 B2 * | 3/2005 | Muramatsu | G06K 19/06037 235/462.01 |
| 6,997,384 B2 | 2/2006 | Hara | |
| 7,222,790 B2 * | 5/2007 | Kitazumi | G06K 7/10831 235/435 |
| 7,281,660 B2 * | 10/2007 | Kim | G06K 7/1063 235/462.07 |
| 8,702,010 B2 | 4/2014 | Denniston, Jr. | |
| 8,763,917 B2 | 7/2014 | Rowe | |
| 2010/0085607 A1 | 4/2010 | Lapstun | |
| 2011/0127331 A1 * | 6/2011 | Zhao | G06K 7/10544 235/462.01 |
| 2013/0219479 A1 | 8/2013 | DeSoto et al. | |
| 2014/0061316 A1 * | 3/2014 | Narayanaswami | G06K 19/06037 235/492 |
| 2014/0301179 A1 | 10/2014 | Rich et al. | |

FOREIGN PATENT DOCUMENTS

JP 2013041327 A * 2/2013

* cited by examiner

*Primary Examiner* — Thien M Le
(74) *Attorney, Agent, or Firm* — Richard C. Litman

(57) ABSTRACT

The pressure profile data coding system and method maps the binary data standard format (0, 1) to a prominent and a non-prominent square shape milled inside a proper material called the code stamp. The code stamp can be scanned using a high spatial resolution, high sensitivity pressure sensor array to get a pressure profile coded image of this code stamp. The acquired gray level image has two color regions including one color region having high gray color values mapping the prominent region of the code stamp, and the second color region having low gray color values mapping the non-prominent region of the code stamp. The two color regions are arranged in a square grid, which can be processed using Reed-Solomon error correction until the image can be appropriately interpreted. The required data are then extracted from patterns present in both horizontal and vertical components of the image.

8 Claims, 5 Drawing Sheets

PRESSURE PROFILE DATA CODING SYSTEM AND METHOD

BACKGROUND OF THE INVENTION

1. Field of the Invention

The present invention relates generally to data presentation on physical media, and particularly to a pressure profile data coding system and method that maps the binary data standard format (0, 1) to a prominent and a non-prominent square shape milled inside a proper material called a code stamp and to a device and method for electronically decoding the data recorded on the code stamp.

2. Description of the Related Art

A data coding method provides a machine-readable representation of data relating to the object to which it is attached. For example, an optical data coding method, such as a barcode, systematically represents data by varying the width and spacing of parallel lines. Yet, there remains the possibility that a more robust data coding method may be discovered.

Thus, a pressure profile data coding system and method solving the aforementioned problems is desired.

SUMMARY OF THE INVENTION

The pressure profile data coding system and method maps the binary data standard format (0, 1) to a prominent and a non-prominent square shape milled inside a proper material called the code stamp. The code stamp can be scanned using high spatial resolution, high sensitivity pressure sensor array to get a pressure profile coded image of the code stamp. The acquired gray level image has two color regions, including one color region having high gray color values mapping the prominent region of the code stamp, and the second color region having low gray color values mapping the non-prominent region of the code stamp. The two color regions are arranged in a square grid, which can be processed using Reed-Solomon error correction until the image can be appropriately interpreted. The required data are then extracted from patterns present in both horizontal and vertical components of the image.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
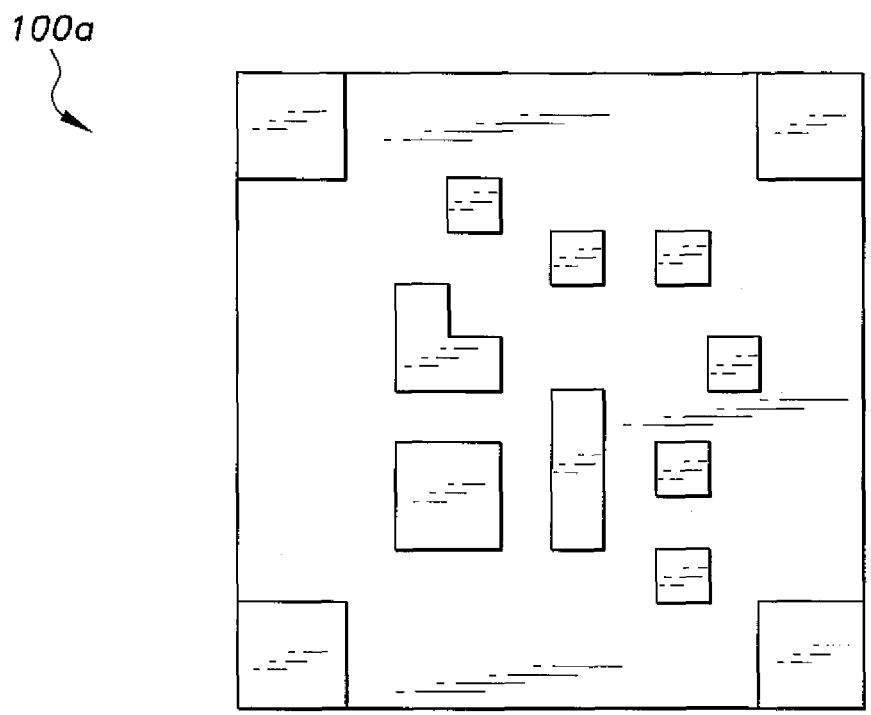
FIG. 1A is a plan view of an exemplary code stamp in a pressure profile data coding system and method according to the present invention.
Figure 1B:
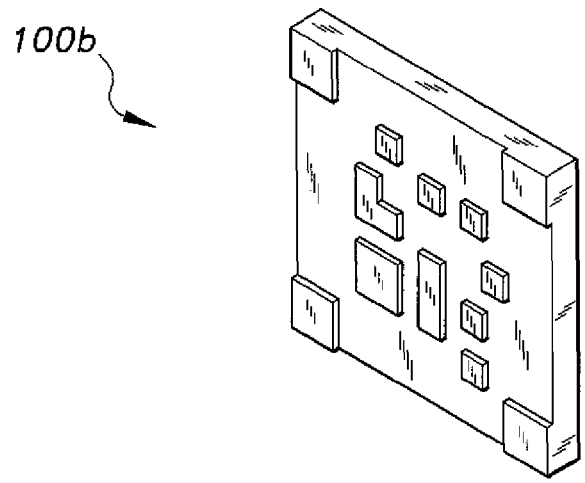
FIG. 1B is a perspective view of the code stamp of FIG. 1A.

The pressure profile data coding system and method maps the binary data standard format (0, 1) to a prominent and a non-prominent geometrical shape, such as a square shape milled inside a proper material called the code stamp $100b$ (shown in FIG. 1B). A 2D plan $100a$ of code stamp $100b$ is shown in FIG. 1A. The code stamp $100b$ can be scanned using a high spatial resolution, high sensitivity pressure sensor array to get a pressure profile coded image of this code stamp. The acquired gray level image has two color regions, including one color region having high gray color values mapping the prominent region of the code stamp, and the second color region having low gray color values mapping the non-prominent region of the code stamp. The two color regions are arranged in a square grid, which can be processed using Reed-Solomon error correction until the image can be appropriately interpreted. The required data are then extracted from patterns present in both horizontal and vertical components of the image.

The code stamp $100b$ holds the pressure profile of the mapped binary data. Data may be compressed before mapping using many possible compression and/or encryption techniques.

The code stamp $100b$ has four large prominent squares at the four corners of the stamp $100b$. Each square has a size of 8 mm×8 mm, and a prominence height 1 mm. The four large squares are used as a code stamp position alignment guides.

The exemplary code stamp $100b$ is a sample for 64 bits (the present method contemplates a design that could have any number of bits in the code stamp). For each bit, there exists a prominent or non-prominent square, depending on the required bit coded value. This square is called the data square. Thus, there are 64 data squares for the 64 bits. The bit value vs prominence/non-prominence mapping is detailed in Table 1.

TABLE 1

Bit Value vs Prominence/Non-Prominence Mapping

| Bit Value | Prominent/Non-Prominent |
|---|---|
| 0 | non-prominent |
| 1 | prominent |

Each data square size is 4 mm×4 mm, and if the bit is prominent, it will have a prominence height of 1 mm. The size of these squares should be larger than the spatial resolution used in the pressure sensor array. Here, the present sensor array spatial resolution is 2 mm×2 mm, so that for each data square region (bit), there are four pressure sensors. Simply, the minimum required total number of sensor array elements to scan the code stamp sample $100b$ is calculated as follows. A single data square area=4 mm×4 mm=16 mm². The code stamp squares data area=64×single data square area=1024 mm². The position alignment large square area=8 mm×8 mm=64 mm². The code stamp alignment squares area=4×Position alignment large square area=256 mm². The code stamp total area=code stamp squares data area+Code stamp alignment squares area=1024 mm²+256 mm²=1280 mm². The pressure sensor area=2 mm×2 mm=4 mm². The total number of sensor array elements=Code stamp total area/Pressure sensor area=320 sensors. The exemplary code stamp 100b maps to the 64 bit values shown in Table 2.

TABLE 2

| | | | 64 Bit Mapping Values | | | | |
|---|---|---|---|---|---|---|---|
| 0 | 0 | 1 | 0 | 0 | 0 | 0 | 0 |
| 0 | 0 | 0 | 0 | 1 | 0 | 1 | 0 |
| 0 | 1 | 0 | 0 | 0 | 0 | 0 | 0 |
| 0 | 1 | 1 | 0 | 0 | 0 | 0 | 1 |
| 0 | 0 | 0 | 0 | 1 | 0 | 0 | 0 |
| 0 | 1 | 1 | 0 | 1 | 0 | 1 | 0 |
| 0 | 1 | 1 | 0 | 1 | 0 | 0 | 0 |
| 0 | 0 | 0 | 0 | 0 | 0 | 1 | 0 |

Figure 2:
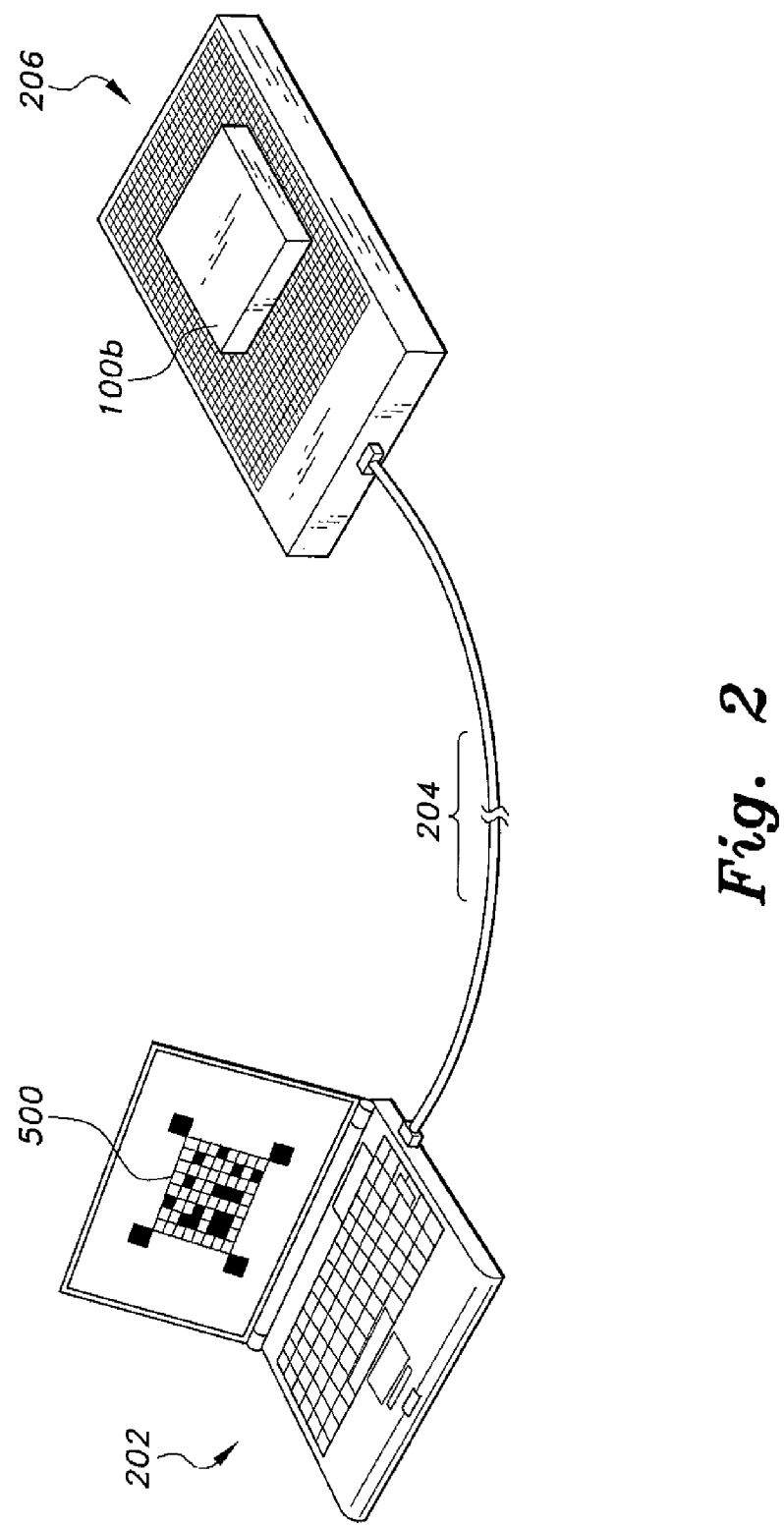
FIG. 2 is a perspective view of an exemplary pressure profile scanner in a pressure profile data coding system and method according to the present invention.
Figure 3:
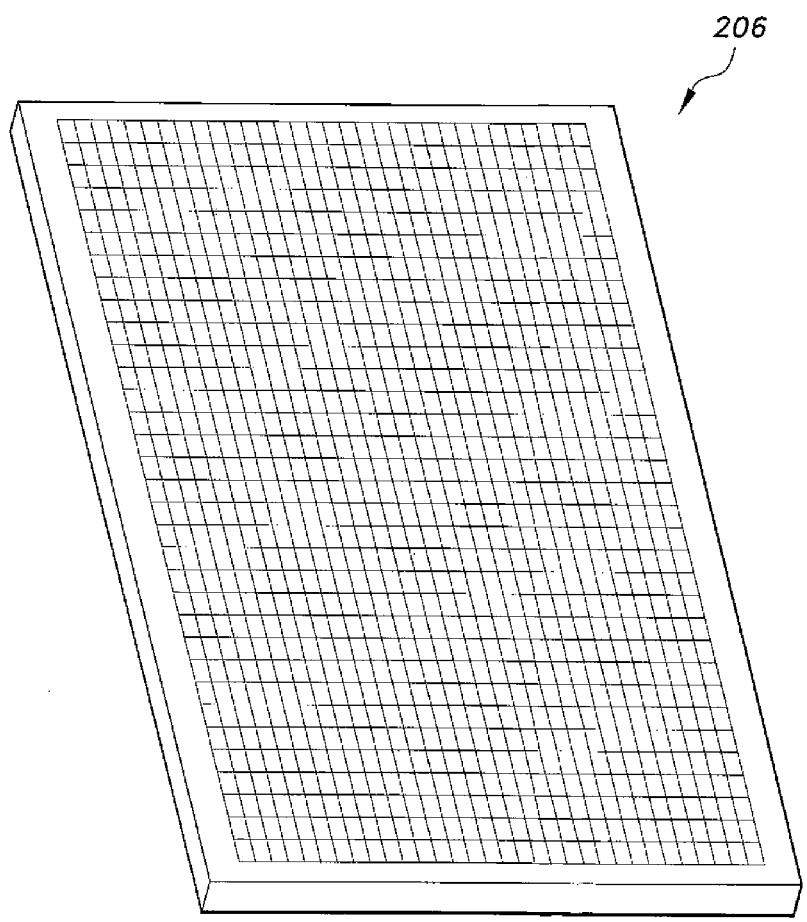
FIG. 3 is a perspective view of a pressure sensor array in a pressure profile data coding system and method according to the present invention.

The pressure profile scanner shown in FIG. 2 is used to scan the code stamp 100b. The pressure sensor array 206 number of sensor elements should be larger than 320 elements to scan our 64 bits code stamp 1001). The pressure profile scanner is connected via USB cable 204 to the USB port of an image scanning display computer 202, which displays the pressure profile coded image 500 on its screen. FIG. 3 shows a detailed view of the pressure sensor array 206.

The code stamp 100b is placed over the pressure sensor array 206, just as papers are scanned using ordinary optical paper scanners. It may be necessary to lightly press on the code stamp 100b while it's being scanned. The pressure sensor array 206 acquires a coded pressure profile image of the prominent and non-prominent areas of code stamp 100b. This image is sent to the scanning computer 202 through a standard USB interface for further processing. The required data are then extracted from patterns present in both horizontal and vertical components of the image.

Figure 4:
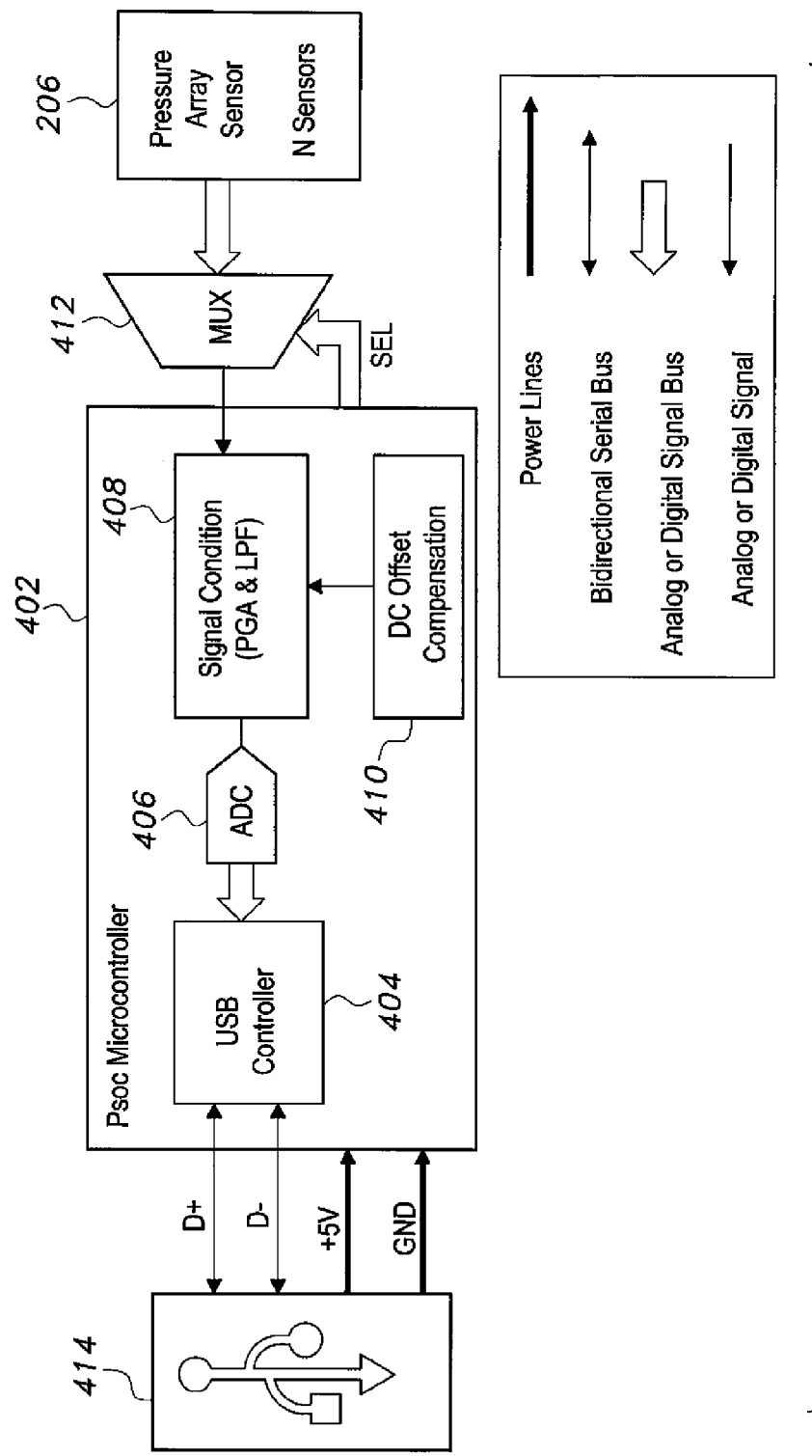
FIG. 4 is a block diagram of an exemplary pressure profile scanner in a pressure profile data coding system and method according to the present invention.

In general, the pressure profile scanner utilizes a processor, such as a Programmable System-on-Chip (PSoC) microcontroller 402, shown in FIG. 4. The PSoC microcontroller 402 includes a USB controller 404 connected to an analog-to-digital converter 406, which is connected to a signal conditioner 408. A DC offset compensator 410 is connected to the signal conditioner. The pressure profile sensor array 206 is connected to a multiplexer 412, which, in turn, feeds the signal conditioner 408 of the PSoC microcontroller 402. The N×1 multiplexer 412 is controlled by select SEL signals from the PSoC microcontroller 402. The pressure profile sensor array 206 has N sensors in the array. The N analog signal outputs from the pressure profile sensor array 206 are input into the analog multiplexer 412 (MUX NX1). The output of the analog MUX 412 is input into the PSoC mixed signal microcontroller 402. The microcontroller 402 sends the MUX select inputs to scan the whole pressure sensor N elements continuously. The microcontroller 402 comprises a signal conditioner 408, a DC offset compensator 410, an 8-bit-ADC 406, and a USB controller 404 for data port 414. The sensor signal output from the MUX 412 is input to the microcontroller signal conditioner 408 that conditions (e.g., by amplification with a programmable gain amplifier (PGA) and/or filtering with allow pass filter (LPF)) the input, which may also require a DC offset applied by the DC offset compensator 410. Thereafter, the signal enters the ADC 406 for digitization to get gray level images (N bytes) of the scanned code stamp area. Data from the ADC 406 is sent to the USB controller 404 (through data end points of the PSoC micro controller 402). The pressure profile scanner of FIG. 4 interfaces to the image scanning display computer 202 using a standard USB cable such that the pressure profile image can be transferred to the image scanning display computer 202. The following specification and parameters are merely illustrative. For example, the MUX 412 may have a high impedance input, input signals rail-to-rail, and a number of inputs up to N. The signal conditioner 408 may be a PGA having a high impedance input, wide bandwidth, low offset output voltage, and up to thirty-three user-programmable gain settings with a maximum gain of 48.0.

Alternatively, the signal conditioner 408 may be an LPF having a programmable corner frequency and damping ratio with no external components, and it may be second order.

The ADC 406 may have an 8-bit resolution with single-ended/differential input, using an unsigned data format with a sample rate up to 15.6K samples per second, and an input range defined by an internal reference of the PSoC microcontroller 402.

The USB data port controller 404 may be USB bus-powered, have eight unidirectional data endpoints, and one bidirectional control endpoint 0 (EP0).

Figure 5:
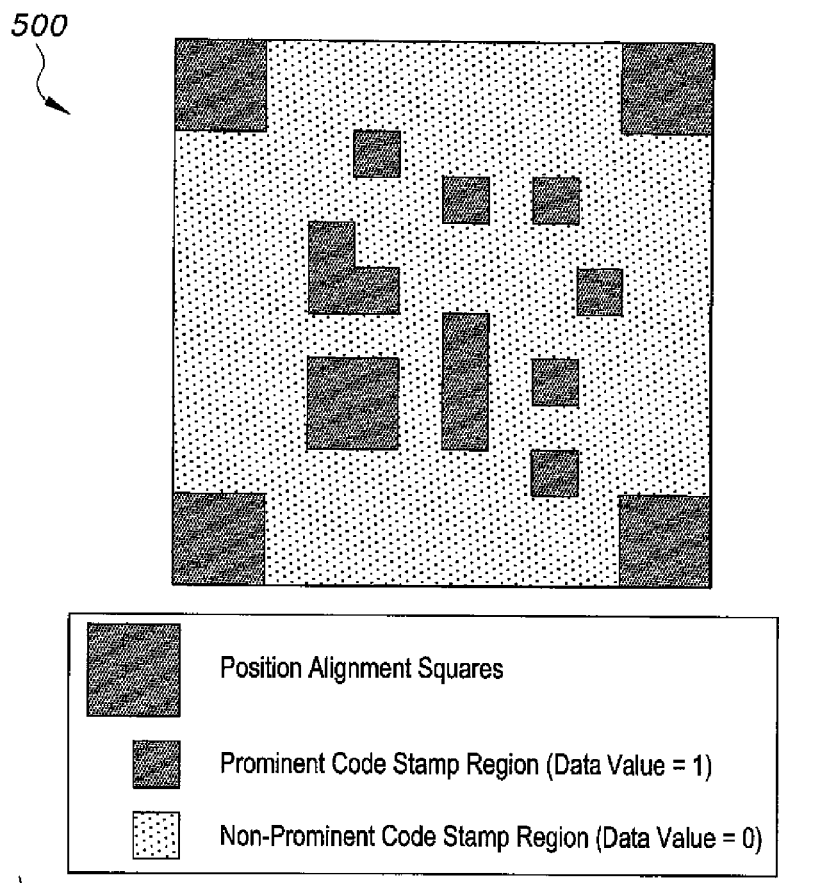
FIG. 5 is a front view showing a pressure profile coded image of the code stamp as captured by the pressure profile scanner in a pressure profile data coding system and method according to the present invention.

The pressure profile coded image 500 shown in FIG. 5 is a gray mapped image (each pixel's value is represented by 8 bits, resulting in a 256-value palette, where each image pixel occupies a single memory byte). This image may have a color region with high gray color values, which map the prominent places of the code stamp (high pressure region), and a color region with low gray color values, which map the non-prominent places of the code stamp (low pressure region). These two color regions have high contrast so that they can be separated easily using image-processing techniques. The high gray color values region is a mapping for binary data value 1, and the low gray color values region is a mapping for binary data value 0. Also four large squares (at the four corners of the image) have high gray color values, wherein these large square areas of prominence are used for image position alignment.

Figure 6:
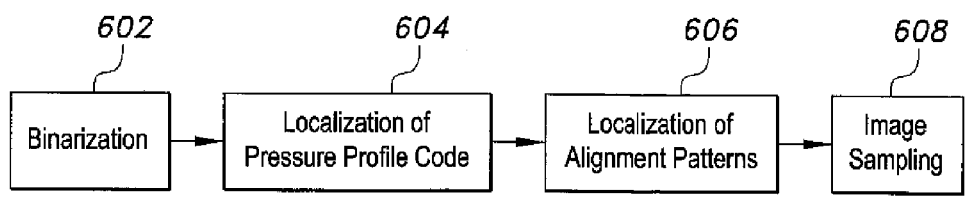
FIG. 6 is a flowchart of decoding steps to decode a pressure profile code image in a pressure profile data coding method according to the present invention.

The pressure profile code image decoding and image processing techniques used are similar to techniques used for QR (Quick response) code images. As shown in FIG. 6, the decoder flowchart of pressure profile code image includes a binarization step 602 in which the Image collected is converted to gray scale format by gray-scale processing. Localization of the pressure profile code 604 is performed, in which finder patterns may be obtained from a relationship, such as the ratio between black blocks and white blocks. Localization of alignment pattern 606 easily determines the height and width of each finder pattern. Image sampling 608 refers to using the located pressure profile code to determine that the bits represented by each grid are 0 or 1.

It is contemplated that the present method can be used to create an exemplar for authentication of processes or objects, such as access control applications, electronic signature applications, website login applications, data encryption codes, digital business cards, and permanent data storage stamp attached to items (e.g., vehicle motors).

It is to be understood that the present invention is not limited to the embodiments described above, but encompasses any and all embodiments within the scope of the following claims.

I claim:

1. A pressure profile data coding method, comprising the steps of:

mapping binary data standard format (0, 1) to a geometrical shape having prominent and non-prominent regions milled inside a code stamp and obtaining a pressure profile coded image of the code stamp;

using the binary data standard format mapping of the code stamp as an exemplar for authentication of an object or process;

using a pressure sensor array to obtain the code stamp's pressure profile coded image;

acquiring a gray level image region having high gray color values mapping the prominent regions of the code stamp;

acquiring a gray level image region having low gray color values mapping the non-prominent regions of the code stamp, wherein the high and low gray color regions are arranged in a square grid based on square shaped prominent regions milled inside the code stamp;

extracting from patterns present in both horizontal and vertical components of the image;

performing image position alignment using large areas of prominence disposed on the code stamp;

obtaining finder patterns derived from a ratio between black blocks and white blocks of the image, wherein the pressure profile code is localized;

obtaining a height and width of each finder pattern wherein an alignment pattern of the large areas of prominence used for image position alignment is localized;

wherein the binary data standard format (0, 1) mapping occurs according to a located pressure profile code; and forming data squares on the code stamp so that the data squares are larger than a spatial resolution of the pressure sensor array.

2. The pressure profile data coding method according to claim 1, further comprising the step of processing the high and low gray color regions using Reed-Solomon error correction until the image can be appropriately interpreted.

3. A pressure profile data coding system, comprising:

a processor;

a pressure sensor array in operable communication with the processor, the pressure sensor array taking pressure readings from a geometrical shape having prominent and non-prominent regions milled inside a code stamp;

means for digitizing the pressure readings taken by the pressure sensor array to get gray level pressure profile images (N bytes) of the code stamp, wherein the gray level pressure profile images are arranged in a square grid based on square shaped prominent regions forming data squares milled inside the code stamp, wherein the pressure sensor array has a spatial resolution capable of resolving pressure area sizes smaller than the data squares;

a data port controller in operable communication with the processor; and an image scanning display computer connected to the data port, the image scanning display computer displaying the pressure profile images on its screen.

4. The pressure profile data coding system according to claim 3, wherein the gray level pressure profile images consist of a first color region having high gray color values mapping the prominent regions of the code stamp and a second color region having low gray color values mapping the non-prominent regions of the code stamp.

5. The pressure profile data coding system according to claim 4, further comprising a multiplexer connected between the pressure sensor array and the processor, the multiplexer selecting inputs to scan all pressure sensor elements continuously into the processor.

6. The pressure profile data coding system according to claim 5, wherein the processor further comprises a signal conditioner circuit for conditioning the pressure data before the data is digitized.

7. The pressure profile data coding system according to claim 6, wherein the signal conditioner circuit is selected from the group consisting of a programmable gain amplifier circuit and a low pass filter circuit.

8. The pressure profile data coding system according to claim 6, further comprising a DC offset compensator connected to the signal conditioner circuit.

\* \* \* \* \*